United States Patent [19]

Fang

[11] Patent Number: 5,705,604

[45] Date of Patent: Jan. 6, 1998

[54] TIRE SEALER AND INFLATOR COMPOSITIONS

[75] Inventor: Jiafu Fang, Conroe, Tex.

[73] Assignee: Pennzoil Products Company, The Woodlands, Tex.

[21] Appl. No.: 672,863

[22] Filed: Jun. 28, 1996

Related U.S. Application Data

[62] Division of Ser. No. 434,821, May 4, 1995, Pat. No. 5,618,912.

[51] Int. Cl.$^6$ .................................................. C08G 61/00
[52] U.S. Cl. ...................... 528/397; 528/401; 524/462; 524/534; 524/565; 523/166; 152/337.1; 152/338.1
[58] Field of Search ............................ 524/462, 534, 524/565; 452/337.1, 338.1; 523/166; 528/397, 401; 152/337.1, 338.1

[56] References Cited

U.S. PATENT DOCUMENTS

| | | |
|---|---|---|
| 3,483,053 | 12/1969 | Orlando et al. . |
| 3,860,539 | 1/1975 | Miyazato . |
| 4,337,322 | 6/1982 | Jaspon . |
| 4,422,877 | 12/1983 | Spitzer et al. . |
| 4,501,825 | 2/1985 | Magyar et al. . |
| 4,970,242 | 11/1990 | Lehman . |
| 5,011,866 | 4/1991 | Suh . |
| 5,089,160 | 2/1992 | Pallone et al. . |
| 5,124,395 | 6/1992 | Abramowski et al. . |
| 5,142,395 | 8/1992 | Yamazaki et al. . |
| 5,338,776 | 8/1994 | Peelor et al. . |

OTHER PUBLICATIONS

Report of the Committee On Science, Space and Technology, U.S. House of Representatives, One Hundred First Congress, Second Session, Jul. 11, 1990, No. 149, p. 61.

"Potential subsitutes to Cholofluorocarbons as Aerosol Propellants", ICI Chemicals and Polymers Limited, Brochure No. GC/20069/20707/2ED/23/989, Cheshire, England, Sep. 1989.

"Arcton' 134a Preliminary Data Sheet", ICI Chemicals and Polymers Limited, Brochure No. GC/16882/2008/4ED/13/789, Jul. 1989.

*Primary Examiner*—James J. Seidleck
*Assistant Examiner*—Duc Truong
*Attorney, Agent, or Firm*—Lowe, Price, LeBlanc & Becker

[57] ABSTRACT

This invention relates to novel tire sealer and inflator compositions. The compositions may be aqueous or non-aqueous and comprise a petroleum residual resin sealant, an amorphous polyolefin, an organic solvent, a vapor pressure depressant, and a non-flammable propellant/inflator having an ozone depletion potential of zero. For the aqueous system, the composition further comprises an emulsifier. The compositions are useful for sealing and inflating a punctured tire in combination with a propellant/inflator.

19 Claims, No Drawings

TIRE SEALER AND INFLATOR COMPOSITIONS

This application is a division of application Ser. No. 08/434,821 filed May 4, 1995, now U.S. Pat. No. 5,618,912.

TECHNICAL FIELD

This invention relates to novel tire sealer and inflator compositions. The compositions may be aqueous or non-aqueous and comprise a petroleum residual resin sealant, a polymer co-sealant, at least an organic solvent, and a vapor pressure depressant. The compositions are useful for sealing and inflating a punctured tire in combination with a propellant/inflator.

BACKGROUND OF THE INVENTION

Since chlorine-containing propellants such as chlorofluorocarbons (CFCs) and hydrochlorofluorocarbons (HCFCs) cause ozone depletion in the upper atmosphere, tire inflator compositions containing CFC and HCFC propellants are being banned by the U.S. government and international bodies. Simple hydrocarbons such as propane, butanes, and their mixtures function as propellants in tire inflator compositions and do not destroy the ozone layer, but they are potentially dangerous to the customer and producer due to their flammability. Therefore, it is necessary to develop tire sealant and inflator compositions which use environmentally friendly, nonflammable propellants. Hydrofluorocarbons (HFCs) such as 1,1,1,2-tetrafluoroethane (HFC-134a) satisfy this criteria.

A number of prior art tire sealant and inflator compositions have been described. U.S. Pat. No. 5,142,395 to Abramowski et al. discloses tire sealer and inflator compositions comprising a sealant, a propellant, a vapor pressure depressant, a freezing point depressant, a corrosion inhibitor, and a carrier.

U.S. Pat. No. 4,501,825 to Magyar et al. discloses tire sealant and inflator compositions comprising a resin, a latex sealant, alkylene glycol, fibers, an alkanolamine, a foaming agent and water. The composition is packed in aerosol cans with a propellant/inflator and is used to seal and inflate punctured tires. The Magyar patent discloses examples of suitable resins including phenolic resins, such as phenol-formaldehyde resins and halogenated alkyl phenol resins, and derivatives of hydrogenated vegetable resins.

A recent U.S. Pat. No. 5,338,776 to Peelor et al. discloses a tire sealant and inflator composition comprising an acrylic resin dissolved in a chlorinated solvent such as perchloroethylene.

There is no disclosure in each of the above patents that acetone, methyl ethyl ketone (MEK), acetonitrile, and tributyl phosphate are used as vapor pressure depressants for hydrofluorocarbon propellants such as HFC-134a in tire sealer and inflator compositions. Moreover, none of the patents discloses that petroleum residual resins and amorphous polyolefins are useful as sealants in tire sealer and inflator compositions.

The present invention provides new tire sealer and inflator compositions which represent an improvement over prior art compositions. The present tire sealant and inflator compositions are a substantial improvement over previous commercial tire sealant and inflator compositions for the following reasons: 1. They are nonflammable; 2. They do not use a CFC or HCFC propellant; 3. Formulations can be either aqueous or non-aqueous; and 4. They provide a superior sealing of tire puncture wounds. Other improvements that the present compositions offer over existing and previous formulas include a less or noncorrosive environment toward the can container, better long term chemical stability, and lower cost.

SUMMARY OF THE INVENTION

Tire sealant and inflator compositions normally packaged in an aerosol can are introduced into the cavity of a tire through its valve stem. Typically, a length of flexible tubing or pedestal adapter with a threaded connector in one end that fits the valve stem of the tire provides the connection between the aerosol can and the wound tire. As the valve of the pressurized container is actuated, propellant within the can forces the sealant and inflator composition through the opened valve and into the tire, thereby inflating the tire. As the wound tire spins, the sealant composition travels to the puncture and seals it.

It is therefore an object of the present invention to provide a tire sealant and inflator composition capable of sealing a puncture wound in a tire and inflating the tire.

It is a further object of the present invention to provide a tire sealant composition capable of permanently sealing a puncture in a tire with or without the puncturing object still embedded in the tire.

It is a further object of the present invention to provide an aerosol tire sealant and inflator composition which is essentially non-flammable.

A still further object of this invention is to provide a tire sealant and inflator composition which does not contain any chlorofluorocarbons or hydrochlorofluorocarbons.

Other objects and advantages of the invention will become apparent as the description of the invention proceeds.

In satisfaction of the foregoing objects, the present invention provides a tire sealer composition comprising the following components: (a) a petroleum residual resin sealant, (b) a polyolefin polymer co-sealant, (c) an organic solvent such as hydrocarbon, or a mixture of solvents, (d) a vapor pressure depressant of hydrofluorocarbon propellants, and (e) other components which will become apparent as the description of the present invention proceeds.

When a hydrofluorocarbon propellant is combined with this tire sealer composition, the result is a tire sealer and inflator composition. It should be appreciated that these components of the tire sealer and inflator composition may be further combined with other components discussed herein to obtain both aqueous and non-aqueous tire sealer and inflator compositions.

The present invention further provides a non-aqueous sealant composition comprising a petroleum residual resin sealant; a polyolefin polymer co-sealant; at least one solvent; a vapor pressure depressant; and optionally, a fiber.

The non-aqueous sealant compositions of the present invention comprise:

(a) 5 to 90 wt. % of a petroleum residual resin;
(b) 1 to 50 wt. % of a solvent;
(c) 0.1 to 40 wt. % of a co-solvent;
(d) 0.2 to 20 wt. % of a vapor pressure depressant;
(e) 0.1 to 50 wt. % of amorphous polyolefins; and optionally,
(f) 0.1 to 10 wt. % of a fiber.

The non-aqueous compositions may be combined with a propellant/inflator to achieve a non-aqueous, non-flammable and non-ozone depleting product which is both user-safe and safe for the environment.

The non-aqueous sealant/inflator compositions for this invention comprise:

(a) 20 to 80 wt. % of non-aqueous sealant composition;
(b) 20 to 80 wt. % of hydrofluorocarbon based propellant.

Another aspect of the present invention relates to aqueous sealant and inflator compositions. The aqueous sealant compositions of the present invention comprise a petroleum residual resin; an amorphous polyolefin; a vapor pressure depressant; a freezing point depressant; a carrier; a corrosion inhibitor; an emusifier (surfactant) or emusifier mixture; a solvent or solvent mixture for the petroleum residual resin sealant; and optionally a fiber.

The aqueous sealant compositions for this invention comprise:

(a) 1 to 60 wt. % of a petroleum residual resin sealant;
(b) 2 to 80 wt. % water;
(c) 0.05 to 5.0 wt. % of at least one corrosion inhibitor;
(d) 0.5 to 15 wt. % of a freezing point depressant;
(e) 0.1 to 30 wt. % of at least one emulsifier;
(f) 0.5 to 20 wt. % of at least one vapor pressure depressant;
(g) 1 to 40 wt. % of at least a solvent for the petroleum residual resin sealant;
(h) 0.1 to 30 wt. % of an amorphous polyolefin polymer; and optionally,
(i) 0.1 to 10 wt. % of a fiber;

The aqueous sealant composition may be combined with a propellant/inflator to achieve an aqueous, non-flammable and non-ozone depleting product which is both user-safe and safe for the environment.

The aqueous sealant/inflator composition for this invention comprises:

(a) 20 to 80 wt. % of sealant composition;
(b) 20 to 80 wt. % of hydrofluorocarbon based propellant.

Modifications are possible within the scope of this invention.

DESCRIPTION OF THE INVENTION

This invention will be described in detail with reference to the preferred embodiments and further illustrated by the examples provided.

The present invention is intended to provide superior sealant and inflator compositions capable of sealing a puncture wound in a tire and inflating the same tire to a pressure suitable for driving. The present invention is based, in part, from the inventor's surprising discovery that petroleum residual resins such as petroleum resins, vacuum residuums, and asphalt are good tire sealants when appropriately formulated. These materials are characterized by tackiness, suitable pliability and good adhesiveness to the inner surface of the tire. Thus, tire sealer and inflator compositions comprising petroleum residual resins are remarkably successful because the petroleum residual resin sealant remains adhered to the tire, even while the tire spins and is subject to various forces such as from the road. The petroleum residual resin sealant easily flows into the hole when the puncturing object is removed and sealant is capable of withstanding the internal pressure of the inflated tire. Use of petroleum residual resins renders an extra economic advantage over polymeric tackifier and latex—the petroleum residual resin is less expensive than polymeric tackifier and latex. Successful use of petroleum residual resins as tire sealers is an example of using low grade materials to produce high quality products.

Since HFC-134a has a high vapor pressure at elevated temperatures (for example, its vapor pressure at 130° F. is 199.2 psig), it cannot be directly stored in existing DOT (U.S. Department of Transportation) rated aerosol cans, including the DOT 2Q can which has the highest pressure rating (180 psig at 130° F.) among the conventional DOT designated aerosol containers. Therefore, it is necessary to reduce the vapor pressure of HFC-134a below 180 psig at 130° F. by an appropriate chemical means. The present inventor found that acetone, methyl ethyl ketone, acetonitrile, and tributyl phosphate are much more efficient than polyalkylene glycol (such as butyl cellosolve) as Vapor pressure depressants for HFC-134a. For example, 5% of acetone, methyl ethyl ketone, or acetonitrile, alone or in combination in varying proportions, reduces the vapor pressure of HFC-134a more effectively than 20% of conventional polyalkylene glycol does. In general, if a compound (solvent) is miscible or partially miscible with HFC-134a, it is capable of reducing the vapor pressure of HFC-134a.

The non-aqueous sealant compositions of the present invention comprise generally: 5 to 90 wt. % of a petroleum residual resin sealant; 0.1 to 50 wt. % of an amorphous polyolefin or other suitable polymers; 1 to 50 wt % of an organic solvent such as liquid hydrocarbons; 0.1 to 40 wt. % of a co-solvent which is miscible or partially miscible with HFC-134a while possessing an ability to dissolve the petroleum residual resin sealant and polyolefin co-sealant; 0.2 to 20 wt. % of a vapor pressure depressant such as acetone; and optionally, 0.1 to 10 wt. % of a fiber.

The present invention also includes a non-aqueous inflator/sealant composition comprising 20 to 80 weight percent of the tire sealant composition and 20 to 80 weight percent of a hydrofluorocarbon based propellant such as 1,1,1,2-tetrafluoroethane.

The aqueous sealant compositions of the present invention comprise generally: 1 to 60 weight percent of a petroleum residual resin sealant; 0.1 to 30 wt % of an amorphous polyolefin or other suitable polymers; 2 to 80 weight percent of water, 0.05 to 2.0 weight percent of a corrosion inhibitor such as triethanolamine; 0.5 to 15 weight percent of a freezing point depressant such as ethylene glycol; 1 to 40 weight percent of an organic solvent or mixture of organic solvents for dissolving the petroleum residual resin; 0.2 to 20 weight percent of a vapor pressure depressant such as acetone; 0.1 to 10 weight percent of an optional insoluble organic or inorganic fiber or powder such as cellulose, $TiO_2$, etc.; and 0.1 to 30 weight percent of an emulsifier (surfactant) or mixture of emulsifiers of different ionic charges, and preferably, this emulsifier mixture comprises a combination of either nonionic and anionic or nonionic and cationic surfactants. Typical emulsifiers include, but not limited to, ethoxylated alkylphenol, ammonium or metal salts of sulfated or sulfonated ethoxylated alkylphenols, polyethoxylated alcohols, and polyethoxylated esters.

Typically, the tire sealer and inflator composition is prepared and dispensed in a conventional aerosol can ranging from 6–24 ounces in size, although a person of ordinary skill in the art could easily package the same in various sizes. The aerosol can used to contain the novel composition of the present invention is conventional and well known to those skilled in the art. Generally, the aerosol can kit comprises a cylindrical sealed can of conventional volume and includes a flexible tube (or a pedestal adapter) extending from the top of the can and having a threaded nozzle on the remote end of the tube which is adapted to be screwed onto a tire valve stem. The other end of the tube is connected to a valve in the can top which can be opened by depressing a button so as to allow the pressurized sealant and inflator composition to be discharged from the can into the tire to be sealed and inflated. The composition of the present invention is packaged with sufficient propellant to inflate conventional tires and the like, typically pressurized in the can in a range between 30–100 psig at 70° Fahrenheit and should not exceed 180 psig at 130° F.

The resin component of the present sealant and inflator compositions is a petroleum residual resin. Examples of such resins include petroleum resins, vacuum residuums, and asphalt. Petroleum resins are petroleum distillation residues comprised chiefly of polycyclic hydrocarbons. Vacuum residuums are one of the major products of vacuum distillation. Asphalt is a hydrocarbon residue resulting from the distillation of crudes of high aspbaltic content. A preferred petroleum resin is 2600 VIS Resin sold commercially by Pennzoil Products Company under that name. 2600 VIS RESIN has the following properties and acceptable range limits for the purposes of the present invention:

|  | Test Method | Specification Limits | | |
| --- | --- | --- | --- | --- |
| Properties | ASTM-D | Minimum | Maximum | Typical |
| Gravity °F., API | D-287 |  |  | 16–18 |
| Flash, °F., COCA | D-92 | 600 | 680 | 600–630 |
| Viscosity @ 210° F., SUS | D-145/2161 | 2400 | 3000 | 2450–2750 |
| Color, ASTM | D-1500 |  |  | 8+ |
| Pour Point, °F. | D-97 |  |  | 105 |
| Total Acid No. mgKOH/g | D-664 |  |  | <0.03 |
| Sulfur, wt. % | D3120 |  | 0.25 | 0.23 |
| Carbon Residue, wt. % | D-189 |  | 14.0 | 13.0 |

Due to their tacky property and affinity to rubber surfaces, petroleum residual resins can be used as a tire sealer if it is appropriately formulated. In fact, formulations containing 2600 VIS RESIN perform excellently as tire sealers. Moreover, petroleum residual resin systems are more cost-effective than other conventional latex systems.

The petroleum residual resin is characteristically present in the non-aqueous sealant compositions in a range of 5 to 90 weight percent. In a preferred embodiment, the resin is present in the non-aqueous sealant compositions in an amount of 10 to 80 weight percent, and most preferably from 15 to about 75 weight percent. The non-aqueous sealant and inflator compositions of the present invention are superior over prior art sealant and inflator compositions, especially over prior art latex systems, in that the non-aqueous compositions of the present invention possess a noncorrosive environment and a better puncture sealing ability.

The petroleum residual resin is characteristically present in the aqueous sealant compositions at a range of about 1 to 60 weight percent. In a preferred embodiment, the resin is present in the aqueous sealant composition in an amount of 5 to about 55 weight percent, and most preferably from 8 to about 50 weight percent. The aqueous sealant and inflator compositions of the present invention are superior over prior art sealant and inflator compositions, especially over prior art aqueous latex systems, in that the aqueous compositions of the present invention possess a better puncture sealing ability and a less corrosive environment.

HFC propellants are the preferred inflator and propellant components for use in the present invention in that they are equivalent in terms of propellant qualities to alternative CFC and hydrocarbon propellants. A preferred hydrofluorocarbon propellant is 1,1,1,2-tetrafluoroethane commonly sold and referred to under trade names such as HFC-134a, Arcton 134a, Norflurane, and Refrigerant R-134a. This is a preferred propellant because it does not have a flash point, it contains no chlorine and is, therefore thought not to contribute to ozone layer deterioration in the upper atmosphere, and is non-flammable.

This propellant is also contemplated as being combined in a propellant system or blended with various other HFC propellants in varying proportions and in such a manner so as to yield an effective, essentially non-flammable, and cost-efficient inflator component with minimal, if any, adverse effect on the environment. Other HFC propellants include but are not limited to trifluoroethane and difluoroethane.

The HFC propellant is characteristically present in the non-aqueous tire sealer and inflator composition in a range of about 20 to 80 weight percent. In a preferred embodiment, the HFC propellant is present in the composition in an amount of 25 to about 75 weight percent, and most preferably from 30 to about 70 weight percent.

The HFC propellant is characteristically present in the aqueous tire sealer and inflator composition in a range of about 20 to 80 weight percent. In a preferred embodiment, the HFC propellant is present in the composition in an amount of 25 to about 75 weight percent, and most preferably from 30 to about 70 weight percent.

A solvent suitable for solubilizing the resin and polyolefin components is employed in the aqueous sealant compositions of the present invention. A preferred solvent is an organic, solvent, including, but not limited to, hydrocarbons, alcohols, ketones, esters, and ethers. These solvents are used either alone or in combinations of varying proportions.

The solvent is generally present in the aqueous sealant composition in an amount from 1 to 40 weight percent. In a preferred embodiment, the solvent is present in the composition in an amount from 3 to 38 weight percent, and most preferably from about 5 to 35 weight percent.

Water is employed as the carrier in the aqueous sealant compositions of the present invention. The petroleum resin phase is then emulsified with water by using an emulsifier or mixture of emulsifiers so that the sealant compositions packed in the aerosol container can be easily discharged into the wound tire within a practical temperature range.

The carrier water is generally present in the aqueous sealant composition in an amount from 2 to 80 weight percent. In a preferred embodiment, the carrier is present in the composition in an amount from 5 to 75 weight percent, and most preferably from about 8 to 70 weight percent.

A solvent suitable for solubilizing the resin component is employed in the non-aqueous sealant compositions of the present invention. A preferred solvent is an organic solvent, including, but not limited to, hydrocarbons, alcohols, ketones, esters, and ethers. These solvents are used either alone or in combinations of varying proportions.

The solvent is generally present in the non-aqueous sealant compositions in an amount from about 1 to 50 weight percent. In a preferred embodiment, the solvent is present in the composition in an amount from about 5 to 45 weight percent, and most preferably from about 10 to 40 weight percent.

It is oftentimes either necessary and/or desirable to further depress the vapor pressure of certain propellants such as 1,1,1,2-tetrafluoroethane. For example, HFC-134a has a vapor pressure of 199.2 psig at 130° F. which is too high for a DOT 2Q can since the DOT 2Q can only withstand a maximum pressure of 180 psig at 130° F. without undergoing deformation, and is the highest pressure rated conventional DOT regulated can available economically. In order to use this can, it is required that the vapor pressure of HFC-134a be brought below 180 psig at 130° F. Acetone, methyl ethyl ketone, acetonitrile, tributyl phosphate, and some other organic solvents that are miscible or partially miscible with HFC-134a can effectively lower the vapor pressure of HFC-134a at elevated temperatures. These vapor pressure depressants are used either alone or in combinations of varying proportions.

As the volume of the HFC propellant increases the amount of vapor pressure depressant components may require a proportional increase. The vapor pressure depressants of the present invention are present in both the aqueous and non-aqueous tire sealant and inflator compositions of the present invention in an amount from 0.2 to 20 weight percent. In a preferred embodiment, the vapor pressure depressant is present in the compositions in an amount from about 0.5 to 18 weight percent and most preferably from about 0.8 to 15 weight percent.

The aqueous sealant compositions of the present invention further comprise a corrosion inhibitor. Preferred corrosion inhibitors include triethanolamine and capryloamphoprionate, although other corrosion inhibitors may be used. These corrosion inhibitors are used either alone or in combination of varying proportions.

The corrosion inhibitor is generally present in the aqueous sealant compositions in an amount from about 0.1 to 5.0 weight percent. In a preferred embodiment, the corrosion inhibitor is present in an amount from about 0.15 to 4.0 weight percent, and most preferably from about 0.2 to 3.0 weight percent.

The aqueous sealant compositions of the present invention further comprise preferably a freezing point depressant. A preferred freezing point depressant is ethylene glycol, although other freezing point depressants may be used. These freezing point depressants are used either alone or in combination of varying proportions.

The freezing point depressant is generally present in the aqueous sealant compositions in an amount from about 0.5 to 15 weight percent. In a preferred embodiment, the freezing point depressant is present in an amount from about 1 to 12 weight percent, and most preferably from about 1.5 to 10 weight percent.

The aqueous sealant and inflator compositions of the present invention further comprise at least a surfactant or emulsifier. Preferred surfactants include, but not limited to, ethoxylated alkylphenol, ammonium or metal salts of sulfated or sulfonated ethoxylated alkylphenols, polyethoxylated alcohols, and polyethoxylated esters. These surfactants are used either alone or in combination in varying proportions.

The surfactant or surfactant mixture is generally present in the aqueous sealant compositions in an amount from about 0.1 to 30 weight percent. In a preferred embodiment, the surfactant or surfactant mixture is present in an amount from about 0.2 to 25 weight percent, and most preferably from about 0.5 to 20 weight percent.

The aqueous and non-aqueous sealant compositions of the present invention further optionally comprise a fiber. The fibers can be any suitable fiber which promotes clotting when the composition is applied to a puncture in a tire. Suitable fibers include, but are not limited to, inorganic fibers such as asbestos and fiberglass, and organic fibers, such as cellulose, polypropylene, and similar natural or synthetic polymeric fibers. The preferred fibers are organic fibers and preferably cellulosic fibers. These fibers are used either alone or in combination of varying proportions.

The optional fiber is generally present in the aqueous and non-aqueous sealant compositions in an amount from about 0.1 to 10 weight percent. In a preferred embodiment, the fiber is present in an amount from about 0.2 to 8 weight percent, and most preferably from about 0.3 to 7 weight percent.

The aqueous and non-aqueous sealant compositions of the present invention further preferably comprise a polymer or mixture of polymers as co-sealant or seal-fortifying agent (seal fortifier). The preferred polymers includes polyolefins such as amorphous polypropyleneethylene copolymers, although other appropriate polymers may be also used.

The seal fortifier is generally present in the aqueous and non-aqueous sealant compositions in an amount from about 0.1 to 30 weight percent. In a preferred embodiment, the seal fortifier is present in an amount from about 0.5 to 25 weight percent, and most preferably from about 1 to 20 weight percent.

Although not found to be required, further ingredients such as dispersion agents, rust inhibitors, foaming agents, antioxidants, etc. may be added as are known in the art.

A higher percentage of propellant provides better inflation qualities while, within certain ranges, a higher percentage of resin composition yields better tire sealing qualities. The most preferred compositions seek a balance between the two extremes resulting in a product having effective sealing characteristics in conjunction with adequate inflating properties.

The propellant is present in the final compositions in an amount of between 20 and 80 weight percent, depending on the sealant versus inflator balance design of the final product. More preferably the propellant is present in an amount between 25 and 75 weight percent, and even more preferably between 30 and 70 weight percent.

While the present sealant and inflator compositions are disclosed generally above, preferred embodiments are further discussed and illustrated with reference to the examples below. However, the following examples are presented to illustrate the invention and not considered as limitations thereto.

EXAMPLE 1

An aqueous tire sealant and inflator composition of the following formula was prepared. The total contents of one unit (one can) of the tire sealant and inflator composition weigh from about 300 grams to 700 grams, depending on the tire size targeted.

| Tire Sealant and Inflator Component | Weight % |
|---|---|
| Water | 24.0 |
| Triethanolamine (25% in water) | 0.2 |
| Ethylene glycol | 2.0 |
| Ammonium salt of sulfated polyethoxylated nonylphenol | 0.5 |
| Capryloamphoprionate | 0.2 |
| Alkyl phenoxypoly(ethyleneoxyl)ethanol | 1.0 |
| Polyoxyethylene [POE (3)] tridecyl ether | 2.0 |
| Acetonitrile | 3.0 |
| 2-Ethyl hexyl alcohol | 3.5 |
| Heptane | 2.0 |
| Amorphous polyolefins | 1.6 |
| Vis 2600 Resin | 10.0 |

-continued

| Tire Sealant and Inflator Component | Weight % |
|---|---|
| Propellant HFC-134a | 50.0 |
| Total | 100.0 |

500 grams of the above formulation was packaged in a conventional aerosol can (DOT 2Q) of standard size 2$^{11}$/$_{16}$× 7$^{13}$/$_{16}$" (diameter×height). The can pressure was measured to be below 180 psig at 130° F. The composition inside the can was discharged into a P195/75R14 Goodyear Invicta GL tire punctured with a $^{5}$/$_{32}$" nail on the surface of the tire. The puncture was sealed as the tire was rotated. The pressure was measured to be in the range of 17-30 psig, depending on the ambient temperature.

EXAMPLE 2

A further aqueous sealant and inflator composition was prepared according to the following formula.

| Tire Sealant and Inflator Component | Weight % |
|---|---|
| Water | 24.4 |
| Fiber | 1.0 |
| Ethylene glycol | 2.0 |
| Ammonium salt of sulfated polyethoxylated nonylphenol | 0.5 |
| Capryloamphoprionate | 0.2 |
| Alkyl phenoxypoly(ethyleneoxyl)ethanol | 1.0 |
| Polyoxyethylene [POE (3)] tridecyl ether | 2.0 |
| Acetone | 2.5 |
| Light Mineral Oil | 3.7 |
| Heptane | 2.7 |
| Vis 2600 Resin | 10.0 |
| Propellant HFC-134a | 50.0 |
| Total | 100.0 |

EXAMPLE 3

A further aqueous sealant and inflator composition was prepared according to the following formula.

| Tire Sealant and Inflator Component | Weight % |
|---|---|
| Water | 30.0 |
| Fiber | 0.8 |
| Triethanolamine (25% in water) | 0.5 |
| Ethylene glycol | 2.5 |
| Capryloamphoprionate | 0.2 |
| Octylphenoxypoly(ethyleneoxyl)ethanol | 1.5 |
| Acetone | 3.0 |
| Heptane | 1.5 |
| Vis 2600 Resin | 10.0 |
| Propellant HFC-134a | 50.0 |
| Total | 100.0 |

EXAMPLE 4

A non-aqueous tire sealant and inflator composition with the following components may be prepared. The total contents of one unit (one can) of the tire sealant and inflator composition weigh from about 300 grams to 700 grams, depending on the tire size targeted.

| Component | % by Weight |
|---|---|
| Vis 2600 Resin | 25.4 |
| Light mineral oil or hydrocarbon solvents | 5.0 |
| Octanol | 10.5 |
| Acetone | 1.0 |
| Amorphous polyolefins | 2.5 |
| Propellant HFC-134a | 55.6 |
| Total | 100.0 |

EXAMPLE 5

A further non-aqueous tire sealant and inflator composition was prepared according to the following formula:

| Component | % by Weight |
|---|---|
| Asphalt | 25.0 |
| Light mineral oil or hydrocarbon solvents | 6.0 |
| Ethyl hexyl alcohol | 12.0 |
| Acetone | 1.4 |
| Propellant HFC-134a | 55.6 |
| Total | 100.0 |

In each case of the above examples, the vapor pressure at 130° F. inside the aerosol container were below the upper limit of 180 psig for a DOT 2Q can.

The compositions can be used in most weather climate conditions, from below freezing to extreme hot. Since the boiling point of the propellant HFC-134a is -15° F. (-26° C.), the tire sealer and inflator composition packed in a can will not properly deliver into the wound tire as the ambient temperature approaches the boiling point. Therefore, in the extremely cold weather, it is necessary to warm up the aerosol can and its content in order to dispense the composition into the cavity of the wound tire.

It will be understood that various details of the present invention will be changed without departing from the scope of the invention. Furthermore, the foregoing description is for the purpose of illustration only, and not for the purpose of limitation—the invention being defined by the claims.

The invention claimed is:

1. An aqueous tire sealer and inflator composition comprising:
   (a) a petroleum residual resin sealant,
   (b) a corrosion inhibitor,
   (c) a freezing point depressant, and
   (d) a non-flammable propellant/inflator having an ozone depletion potential of zero.

2. A composition according to claim 1, wherein the propellant/inflator is a hydrofluorocarbon.

3. A composition according to claim 1, wherein the propellant/inflator is 1,1,1,2-tetrafluoroethane and is present in an amount of about 20% to about 80%.

4. A composition according to claim 1, further comprising a polyolefin polymer.

5. A composition according to claim 4, wherein the polyolefin is amorphous polypropyleneethylene and is present in an amount of about 0.1% to about 20%.

6. A composition according to claim 1, further comprising at least an organic solvent in an amount of about 0.5% to about 30%.

7. A composition according to claim 6, wherein the organic solvent comprises a hydrocarbon, alcohol, ester, ether, and/or ketone, or a mixture of them in varying proportions.

8. A composition according to claim 6, wherein the organic solvent is a mixture of an alcohol with a carbon number ranging from 4 to 20, and a hydrocarbon with a carbon number ranging from 5 to 35.

9. A composition according to claim 1, wherein the petroleum residual resin is obtained either by selecting from the group consisting of petroleum resin, vacuum residuum, and asphalt, or by combining them in varying proportions, and is present in an amount of about 1% to about 40%.

10. A composition according to claim 9 wherein the petroleum residual resin has a flash point in the range of approximately 600° F. to 680° F., a viscosity in the range of approximately 2400 to 3000 SUS at 210° F., and a pour point in the range of 80° F. to 120° F.

11. A composition according to claim 1, further comprising a vapor pressure depressant.

12. A composition according to claim 11, wherein the vapor pressure depressant is obtained either by selecting from the group consisting of acetone, methyl ethyl ketone, acetonitrile, and tributyl phosphate or by combining them in varying proportions, and is present in an amount of about 0.2% to about 15%.

13. A composition according to claim 1, further comprising an emulsifier.

14. A composition according to claim 13, wherein the emulsifier is a surfactant or mixture of surfactants and is present in an amount of about 0.1% to about 25%.

15. A composition according to claim 14, wherein the surfactant(s) is (are) nonionic, and/or ionic.

16. A composition according to claim 15, wherein the nonionic surfactant is an ethoxylated alkylphenol, an ethoxylated alcohol, and/or an ethoxylated ester.

17. A composition according to claim 15, wherein the ionic surfactant is an ammonium or metal salt of sulfated or sulfonated ethoxylated alkylphenol, and/or an alkyl quaternary ammonium salt.

18. A composition according to claim 13, wherein the emulsifier comprises a mixture of ionic surfactant ammonium salt of sulfated polyethoxylated alkylphenol and nonionic surfactant polyethoxylated alkylphenol.

19. A composition according to claim 1, optionally further comprising a fiber, organic or inorganic.

* * * * *